US008037072B1

(12) United States Patent  
Burt et al.

(10) Patent No.: US 8,037,072 B1
(45) Date of Patent: Oct. 11, 2011

(54) SYSTEM AND METHOD FOR GENERATING CHARGE INFORMATION FOR USERS OF A DATA STORAGE SYSTEM

(75) Inventors: Philip N. Burt, Shrewsbury, MA (US); Paul Timmins, Natick, MA (US); Anuradha Shivnath, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 1368 days.

(21) Appl. No.: 10/881,705

(22) Filed: Jun. 30, 2004

(51) Int. Cl.
G06F 7/00 (2006.01)
G06F 17/30 (2006.01)
(52) U.S. Cl. ........................................ 707/737; 707/736
(58) Field of Classification Search .................. 707/736, 707/737
See application file for complete search history.

(56) References Cited

U.S. PATENT DOCUMENTS

| | | | |
|---|---|---|---|
| 6,988,087 B2 * | 1/2006 | Kanai et al. | 705/80 |
| 2002/0152181 A1 * | 10/2002 | Kanai et al. | 705/80 |
| 2004/0039891 A1 * | 2/2004 | Leung et al. | 711/165 |
| 2004/0098383 A1 * | 5/2004 | Tabellion et al. | 707/3 |

OTHER PUBLICATIONS

Engineering White Paper from EMC Corporation: *Using EMC ControlCenter StorageScope to Support Storage Chargeback*, May 26, 2003 located at http://www.emc.com/pdf/techlib/storagescope_support_chargeback.pdf.

* cited by examiner

*Primary Examiner* — Apu Mofiz
*Assistant Examiner* — Jared Bibbee
(74) *Attorney, Agent, or Firm* — Krishnendu Gupta; Gerald P. Kazanjian (57) ABSTRACT

A chargeback management station obtains data records including asset information pertaining to storage assets in a data storage system and utilization information pertaining to the use of the storage assets by the users, wherein the storage assets include redundant storage assets and internal and external storage assets. The data records further include grouping information reflecting a grouping of the storage assets and the users into charge-related groups. The asset and utilization information is selectively aggregated according to the grouping to obtain respective asset and utilization values for raw capacities, usable capacities, and the internal and external storage assets. The asset and utilization values are displayed in corresponding information fields of a graphical user interface that is presented to a system operator and that reflects the charge-related grouping of the storage assets and the users. The system operator can specify the layout for the charge reports displayed on the graphical interface by using a table screen, a graph screen, and a filter screen.

19 Claims, 9 Drawing Sheets

SYSTEM AND METHOD FOR GENERATING CHARGE INFORMATION FOR USERS OF A DATA STORAGE SYSTEM

BACKGROUND OF THE INVENTION

The invention is related to the field of managing computer data storage systems.

Computer data storage systems have evolved into complex arrangements of specialized elements that are coupled together, such as in a modern storage-area network (SAN). A SAN, for example, includes host computers running application programs with storage requirements, such as for file systems and databases. The SAN further includes dedicated storage devices, often termed "arrays", that are packaged into cabinets and are physically and functionally separate from the host computers. The hosts and storage devices are coupled together by a high-speed data network which includes transmission lines and switches.

Because of the complexity and size of SANs, specialized software tools are used to assist a storage system administrator in managing the configuration and operation of the SAN. An example of such storage management tools includes a suite of tools known as "EMC Control Center" sold by EMC Corporation. These tools include a wide variety of management-related features, including controls that enable a system administrator to configure storage and establish channels between the hosts and respective storage devices allocated for use by the hosts, and include monitoring functions for gathering many types of information about system operation, including for example the amount of allocated storage actually used by the respective hosts, the amount of storage traffic flowing through switches or into/from storage devices, the presence of faults or other reportable conditions in the system, etc.

As with expensive capital assets in general, it is necessary to account for the use of storage systems so that costs are correctly allocated among users having separate budgets, whether the users are from separate companies or are sub-units (e.g. departments) of a single company. In the case of single-company users, the assessing of costs to individual department or other sub-units is referred to as "chargeback". Accounting systems can be used for such chargeback purposes, for example. However, accounting systems are often limited to relatively simple models of system use, which can adversely affect the accuracy of any cost allocation scheme. The actual costs of storage system assets may be much more complex and difficult to model accurately from a cost perspective. It may be exceedingly difficult or impossible to accurately reflect subtle aspects of storage system structure or use in a simple accounting-oriented model, leading to the undesirable possibilities of over-charging as well as under-charging system users.

SUMMARY OF THE INVENTION

In accordance with the present invention, methods and apparatus are disclosed for enabling a data storage service provider to generate charge information for users of a data storage system. The charge information reflects important details of the storage system, thereby providing for accurate sharing of costs among a number of storage system users.

In a disclosed method, a chargeback management station obtains data records including asset information pertaining to storage assets in the data storage system and utilization information pertaining to the use of the storage assets by the users. In particular, the storage assets include redundant storage assets having raw storage capacities exceeding usable storage capacities, and further include (i) internal storage assets directly accessible by respective host computers and (ii) external storage assets separate from the host computers. These are examples of the type of specific subtle aspects of storage system configuration and use that are not easily captured in a simple cost model. The data records further include grouping information reflecting a grouping of the storage assets and the users into respective charge-related groups, such as departments, cost centers, etc.

The asset and utilization information is selectively aggregated according to the grouping to obtain respective asset and utilization values for the raw storage capacities, the usable storage capacities, the internal storage assets, and the external storage assets. The asset and utilization values are displayed in corresponding information fields of a graphical user interface that is presented to a system operator, the graphical interface reflecting the charge-related grouping of the storage assets and the users. This information can be used by an operator to generate charges for the use of the storage assets in accordance with a schedule or plan. This could be performed manually if desired, or it may be desirable to load the displayed information directly into a spreadsheet, for example, which can automatically apply predetermined charge factors to arrive at a set of charges.

In another aspect, a disclosed graphical interface enables the system operator to specify the layout for charge reports to be displayed as part of the graphical interface. The layout specification includes a selection of information fields including user group identifiers and respective utilization amounts of the storage assets. In a further aspect, the graphical interface includes a table screen, a graph screen, and a filter screen. The table screen enables the selection and arrangement of information fields from a set of available information fields for inclusion in a table-style report of the graphical interface. The graph screen enables the specification of a type of graph to be displayed as part of the user interface, and the filter screen enables the specification of one or more criteria for limiting the items displayed as part of the user interface, such as displaying only storage groups that use more or less than a specified amount of storage in the system.

Other aspects and advantages of the disclosed methods and apparatus are described in the Detailed Description below.

DETAILED DESCRIPTION

Figure 1:
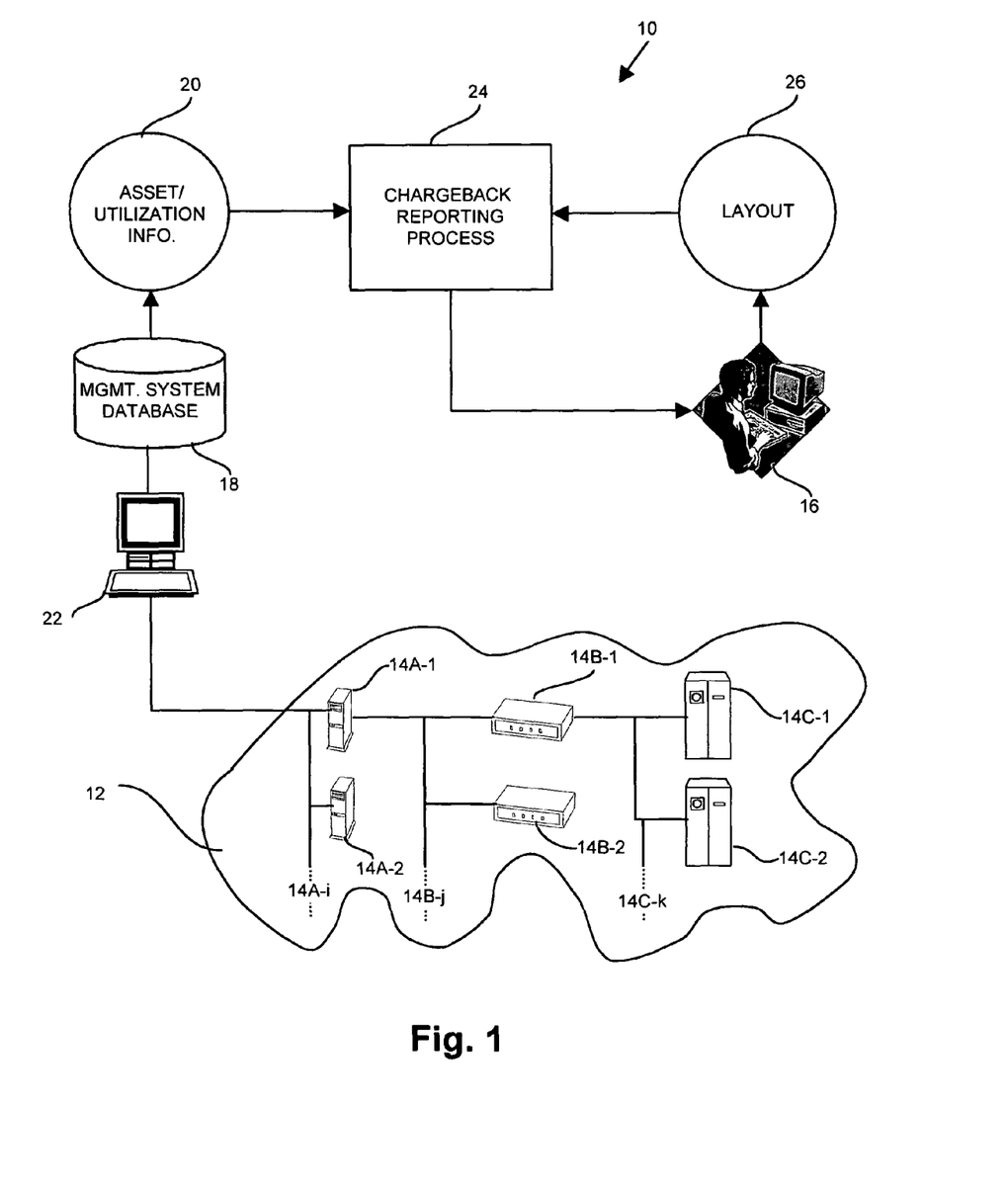
FIG. 1 is a block diagram of a storage area network (SAN) with a chargeback reporting station coupled thereto in accordance with the present invention.

In the present specification, a reference to drawing number 14A should be understood to be a reference to 14A-1, 14A-2, and 14A-i of FIG. 1. Similarly, a reference to 14B should be understood to be a reference to 14B-1, 14B-2, and 14B-j of FIG. 1 and a reference to 14C should be understood to be a reference to 14C-1, 14C-2, and 14C-k of FIG. 1. Additionally, a reference to 14 should be understood to be a reference to 14A, 14B, and 14C.

FIG. 1 shows an exemplary managed information network 10, which includes a storage area network (SAN) 12 including multiple manageable entities 14 and a chargeback reporting station 16. The manageable entities (MEs) 14 are SAN nodes operative to perform various SAN operations, and include host nodes 14A, connectivity nodes or switches 14B, and storage device nodes 14C. The chargeback reporting station 16 provides organization and reporting of data indicative of utilization of the manageable entities 14 in the SAN 12 for purposes of generating charges for users of storage assets within the SAN 12.

A management system database 18 stores asset and utilization information 20 regarding the configuration and utilization of the manageable entities 14 within the SAN 12. A system manager manages the SAN 12 via a management console 22, which both maintains the management system database 18 and employs the management system database 18 for SAN management functions. The chargeback reporting station 16 includes a chargeback reporting process 24 for receiving and processing the asset/utilization information 20 to generate chargeback-related data and to present the data to an operator on a display device, as described in more detail below. As part of its operation, the chargeback reporting station 16 permits an operator to specify a layout 26 for reports that are generated and displayed to the operator.

Generally, the manageable entities 14 include software entities termed "agents" that are responsible for collecting local information and providing it to the management system database 18. Such agent-based reporting is generally known in the art, with examples including Simple Network Management Protocol (SNMP) in the communications domain, and EMC Control Center® in the storage domain.

While FIG. 1 shows a primarily hardware-centric view of the SAN 12, the following description refers more generally to the collection and presentation of information pertaining to "storage assets" within the SAN 12. The storage assets include physical storage devices such as disk drives, collections of storage devices, and logical entities that reside on storage devices. A storage node 14C, for example, is an example of a collection of disk drives, and also includes logical entities residing on the disk drives. The storage assets may be classified in many ways. In the illustrated embodiment, the following multi-dimensional classification is applicable. The terms appearing in this classification are explained below.

Dimension I—Host-Visible Structure

1. Logical Volume/Volume Group
2. File System
3. Database
4. Host Devices

Dimension II—Location/Protection

1. Internal (assumed unprotected)
2. External or Array (usually protected)
   A. Primary
   B. Local replica
   C. Remote replica

| Dimension III-Capacity/quantity (in convenient units, e.g. gigabytes (GB)) | |
|---|---|
| A1. Total | B1. Raw |
| A2. Used | B2. Usable |
| A3. Accessible | |
| A4. Allocated | |

A "volume" is a host-based storage construct, such as a single block of undifferentiated contiguous storage space, which may coincide with all or part of a physical disk. A "volume group" is a set of logical volume mappings to physical disks or arrays. File systems and databases are higher-level constructs exhibiting much more detailed structure and greater user visibility.

"Internal" storage generally refers to storage devices that reside within a host 14A and fall outside the data protection mechanisms implemented within the SAN 12, specifically those implemented within the storage device nodes 14C. "External" or "array" storage includes storage located in the storage device nodes 14C that are physically distinct from the host nodes 14A and that generally offer some type of protection for stored data. The array storage is divided into primary, local replica and remote replica. "Primary" refers to storage devices that are directly visible to the host nodes 14A and that normally are used in the execution of read and write operations from the host nodes 14A, whereas "replica" devices store copies of the data appearing on the primary devices and are generally used for host data transfers only when an associated primary device has failed or is otherwise unavailable. A replica may be local, meaning that it resides in the same physical location as its corresponding primary (such as within the same cabinet), or it may be remote, meaning that it resides in a separate physical location. Remote replicas are employed as protection against disasters that would affect both primary and local replica storage in a given physical location, such as flood, fire, power outage, etc.

With respect to capacity (Dimension III), "Total" refers to the sum of "Used" and "Free", where "Used" refers to storage that is actually consumed by file systems, databases, etc. and "Free" refers to usable storage that is not presently so consumed. "Accessible" refers to the total amount of storage that can actually be used for I/O by a host 14A, which is exclusive of capacity used for replicas, mirrors etc. "Allocated" capacity can be either host-centric or array-centric. Host allocated capacity consists of logical devices that a host 14A can perform I/O on, plus any associated local or remote replicas. Array allocated capacity is the amount of storage designated for use within a storage device 14C. "Raw" and "Usable" are terms in which the Total/Used/Accessible/Allocated capacities can be expressed. "Raw" refers to the amount of storage capacity made into logical devices or formatted into groups having a defined protection level (for example RAID groups, or mirroring). Raw capacity thus includes "usable" capacity as well as capacity used to provide protection.

Figure 2:
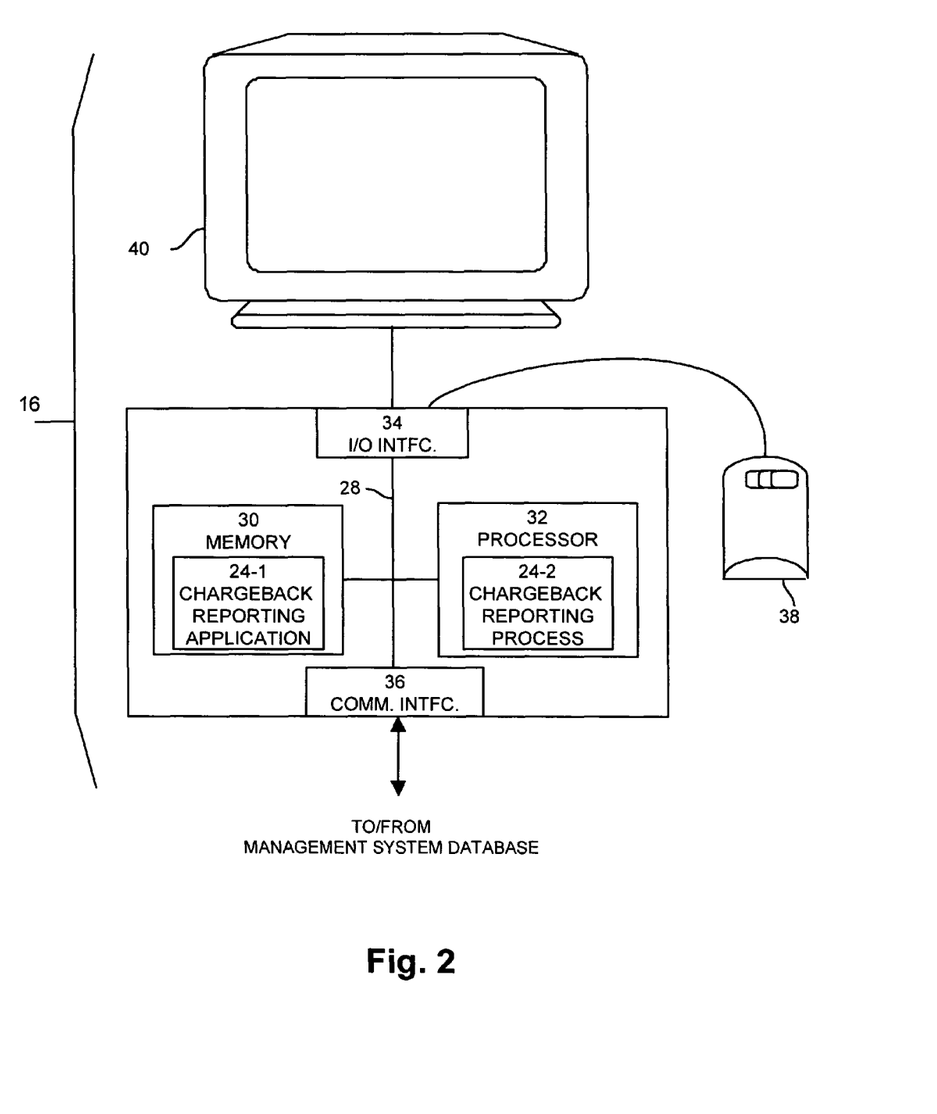
FIG. 2 is a block diagram of the chargeback reporting station of FIG. 1.

FIG. 2 illustrates an example arrangement of the chargeback reporting station 16. The chargeback reporting station 16 includes an interconnection mechanism 28 that couples a memory system 30, a processor 32, an input/output interface 34 and a communications interface 36. The input/output interface 34 allows peripheral devices to be connected to the chargeback reporting station 16. In this example, coupled to the input/output interface 34 and operating as part of the chargeback reporting station 16, are a peripheral input device 38 such as a mouse and/or a keyboard and a peripheral output device such as a computer display 40 upon which the chargeback reporting station 16 can render or otherwise display visual images such as a graphical user interface as described herein. The communications interface 36 allows the chargeback reporting station 16 to communicate with external devices such as the management system database 18 of FIG. 1.

The memory system 30 is encoded with a chargeback reporting application 24-1. The chargeback reporting application 24-1 represents software code such as data and/or logic instructions (e.g., stored in the memory 30 or on another computer readable medium such as a disk) that embody the processing functionality of embodiments of the invention. The processor 32 can access the memory system 30 via the interconnection mechanism 28 in order to launch, run, execute, interpret or otherwise perform the logic instructions of the chargeback reporting application 24-1 in order to produce a chargeback reporting process 24-2. In other words, the chargeback reporting process 24-2 represents one or more portions of the chargeback reporting application 24-1 (or the entire application 24-1) executing within or upon the processor 32 in the chargeback reporting station 16. For purposes of the discussion of the operation of embodiments of the invention, general reference will be made to the chargeback reporting process 24 as performing the various steps and operations to carry out the features of embodiments of the invention.

Is to be understood that embodiments of the invention include the chargeback reporting application 24-1 (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within a memory system such as memory system 30 (e.g., within random access memory or RAM). It is also to be understood that other embodiments of the invention can provide the chargeback reporting application 24-1 operating within the processor 32 as the chargeback reporting process 24-2. While not shown in this example, those skilled in the art will understand that the chargeback reporting station 16 may include other processes and/or software and hardware components, such as an operating system and Web browser, which have been left out of this illustration for ease of description of the invention. In addition, the display 40 need not be coupled directly to the computerized device. In such cases, the chargeback reporting application 24 can execute on one computerized device and can be remotely accessed over a network, for example, in which case the graphical user interface is displayed locally to the user, while the chargeback reporting process 24-2 is executed remotely.

Directing attention now to the graphical user interface, when the chargeback reporting process 24-2 operates within the chargeback reporting station 16, an operator can use the input device 38 to control an input selector such as a mouse pointer to operate on various displayed graphical elements, such as data entry fields and icons, according to the embodiments of the invention. The processor 32 performs the chargeback reporting process 24-2 to carry out this processing as explained herein. Specific operations of embodiments of the invention are discussed next with reference to a flow chart of processing steps in FIG. 3 and exemplary graphical displays in the remaining Figures.

Figure 3:
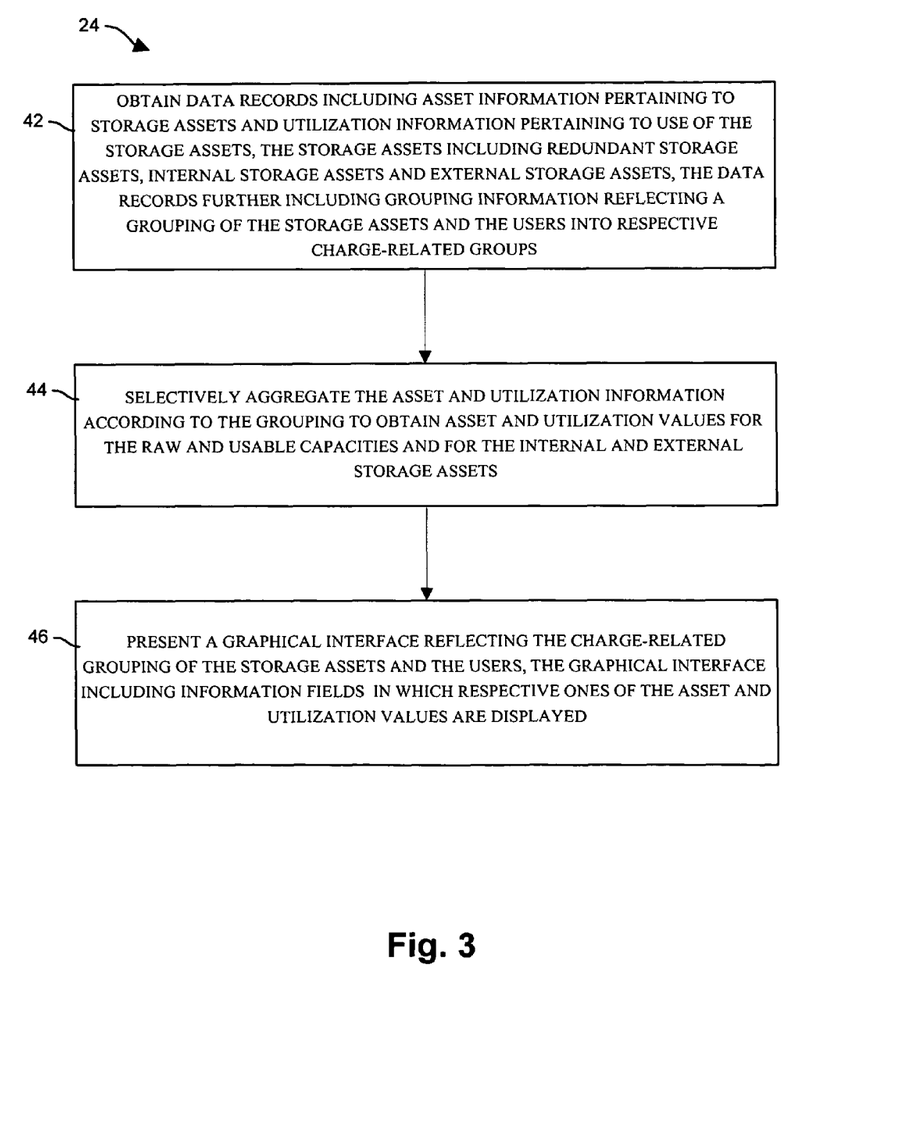
FIG. 3 is a flow diagram of a chargeback reporting process performed by the chargeback reporting station in the system of FIG. 1.

FIG. 3 illustrates the operation of the chargeback reporting process 24. At step 42, data records including the asset and utilization information 20 (FIG. 1) are obtained from the management system database 18. The asset and utilization information pertains to the makeup and use of the storage assets (as described above) within the SAN 12 by the host nodes 14A. More particularly, the asset and utilization information reflects assets classified according to dimensions I and II, and capacity/utilization information according to dimension III. Thus, the following are examples of asset and utilization information obtained in step 42:

Logical Volume "VOL1" located on external array "ARRAY30"
Usable Size 50 GB
Includes file system "FS" currently of size 20 GB
Local Replica "REPLICA1"

This kind of raw information is gathered for all assets within the SAN 12. Additionally, the information in the management system database 18 includes grouping information defining a grouping of host nodes 14A and storage assets for chargeback-related purposes. The grouping is established by the system manager via the management console 22 of FIG. 1. The grouping information is used in a later step of the process as described below.

In step 44 of the process 24, the asset and utilization information that has been collected is selectively aggregated according to the grouping to arrive at specific asset and utilization values that can be used for chargeback-related purposes. As described in more detail below, there can be a large number of such values that may be of potential interest, these values all reflecting the structure and metric classification described above. In particular, however, the asset and utilization values include raw capacities of various assets, such as primary and replica devices; usable capacities (which excludes replicas); storage that is internal to the hosts 14A; and array or external storage that resides in the storage device nodes 14C.

In step 46, a graphical user interface is presented to the operator of the chargeback reporting station 16. The interface reflects the charge-related grouping of the storage assets and hosts established by the system manager as described above. The interface includes a number of information fields in which the asset and utilization values from step 44 are displayed. This information can then be readily used by the operator to generate charges for the use of the storage assets in accordance with a schedule or plan. This could be performed manually if desired, or it may be desirable to load the displayed information directly into a spreadsheet, for example, which can automatically apply predetermined charge factors to arrive at a set of charges.

Figure 4:
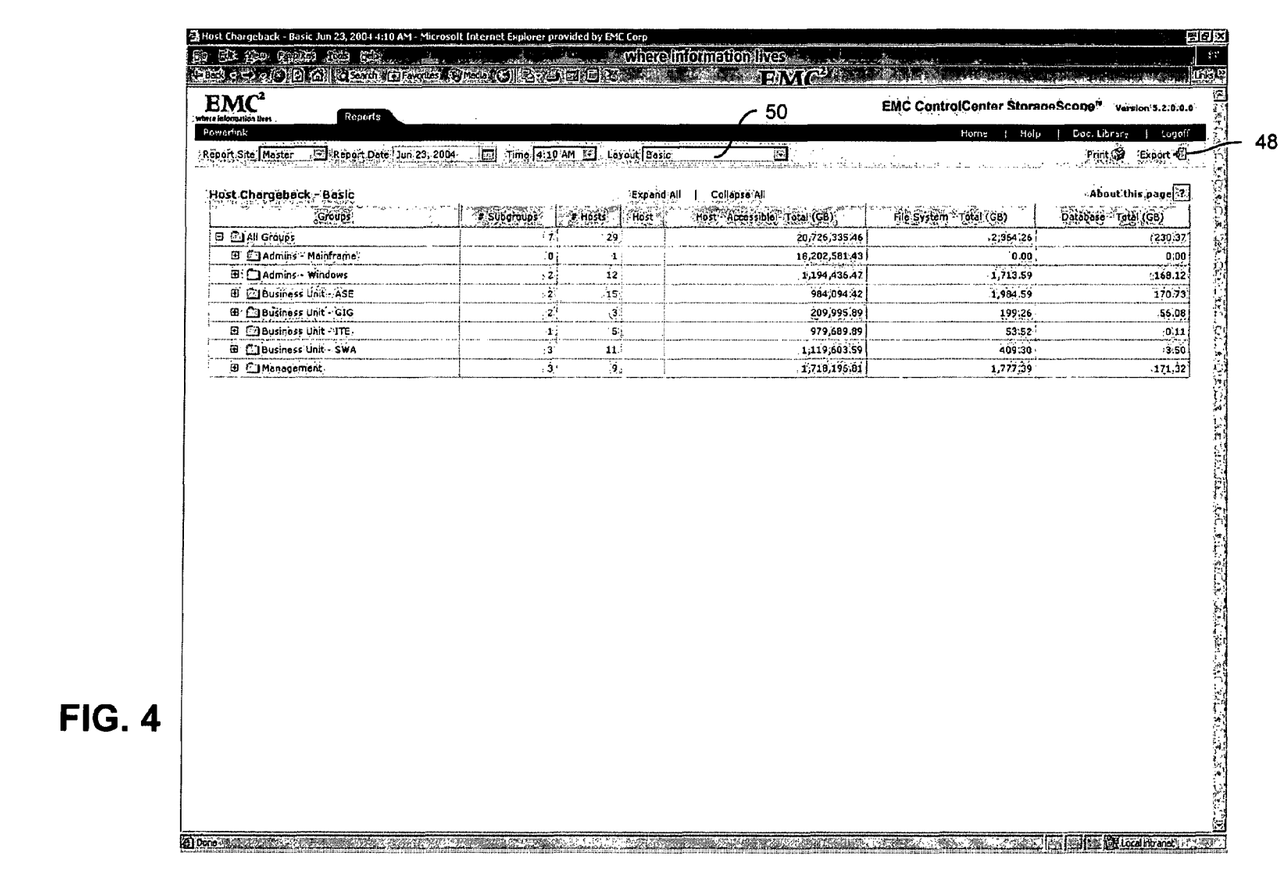
FIGS. 4, 5 and 9 are screen shots of table-style chargeback reports displayed as part of a graphical user interface on the chargeback reporting station of FIGS. 1 and 2 in connection with the chargeback reporting process of FIG. 3.

FIG. 4 shows an example screen of the graphical user interface. In the illustrated embodiment, a table format for displaying the information is utilized. In the left-most column are displayed a set of expandable folders representing different groups that have been pre-established by a system manager as described above. Examples include "Admins-Mainframe", "Admins-Windows" and others as shown. In the illustrated embodiment, these groups are organized under an uber-group called "All Groups". Other hierarchical arrangements are possible.

In the example of FIG. 4, the following information fields for each group appear:

| Field | Description |
| --- | --- |
| # Subgroups | Number of groups defined within the group (not shown) |
| # Hosts | Number of hosts 14A in the group |
| Host | In expanded display, the name of a displayed host 14A |
| Host-Accessible-Total | Total host-accessible capacity (in GB) in the group |

-continued

| Field | Description |
|---|---|
| File System-Total | Total capacity allocated for use by file systems of the group |
| Database-Total | Total capacity allocated for use by databases of the group |

The numbers appearing in the various fields reflect an appropriate aggregation of the asset and utilization information for the relevant groups within the SAN 12. For example, the value 2,235.14 appearing in the File System-Total field for the group "Admins-Windows" is the sum of the sizes of all file systems in the SAN 12 that are accessible by the hosts within the "Admins-Windows" group. As shown below, this group includes twelve hosts each with associated file systems of generally different sizes. The individual size values are obtained from the management database 18 and aggregated to arrive at a size value for this field in the display of FIG. 4. In some cases, it may be that multiple hosts have access to the same file system, and/or that the hosts having access to the file system reside in multiple groups, which generally leads to double-counting of the file system in the aggregation process. The group totals take into account this potential for double-counting. In the "All Groups" totals, values are only counted once. This explains why the value for "File System-Total" for All Groups, for example, is less than the sum of the "File System-Total" values of all the individual groups.

The report page of FIG. 4 includes an "Export" icon 48 which can be used by the operator to initiate a process of exporting the data appearing in the various fields into a spreadsheet or similar file, as mentioned above.

Figure 5:
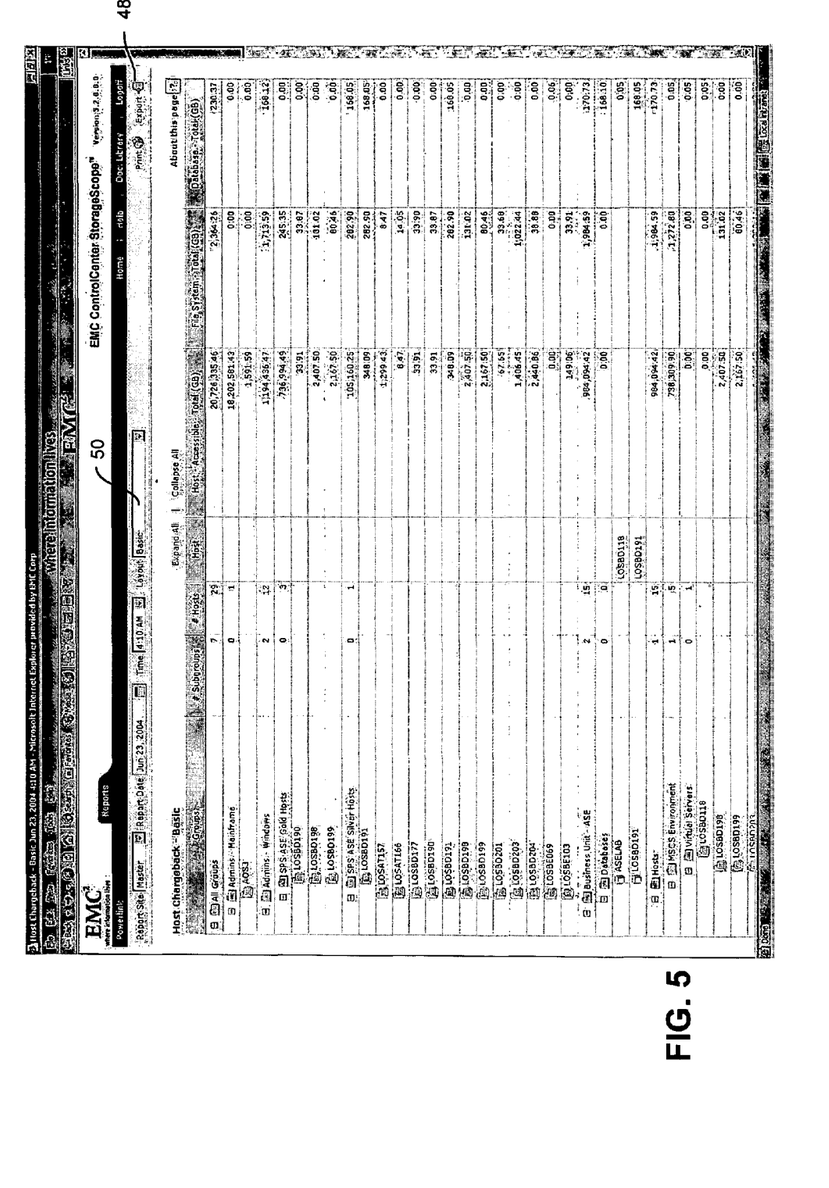

FIG. 5 shows the report of FIG. 4 with each of the groups "expanded", i.e., listing the hosts contained within the group. An operator viewing the summarized, non-expanded display of FIG. 4 can select the "+" icon next to a group to expand that group, and thereby view more details of storage use by the hosts within the group.

A report page as shown in FIGS. 4 and 5 is organized in accordance with a "layout" that in the illustrated embodiment can be specified by the operator via a layout selection pull-down menu 50. Any layouts that have been defined are listed in the pull-down menu, and the operator merely selects one in order to obtain a report page of the desired type. One of the menu items is a command to create a new layout, which might be labeled "<New>" for example. When the operator selects this value, a process for creating a custom layout is invoked.

Figure 6:
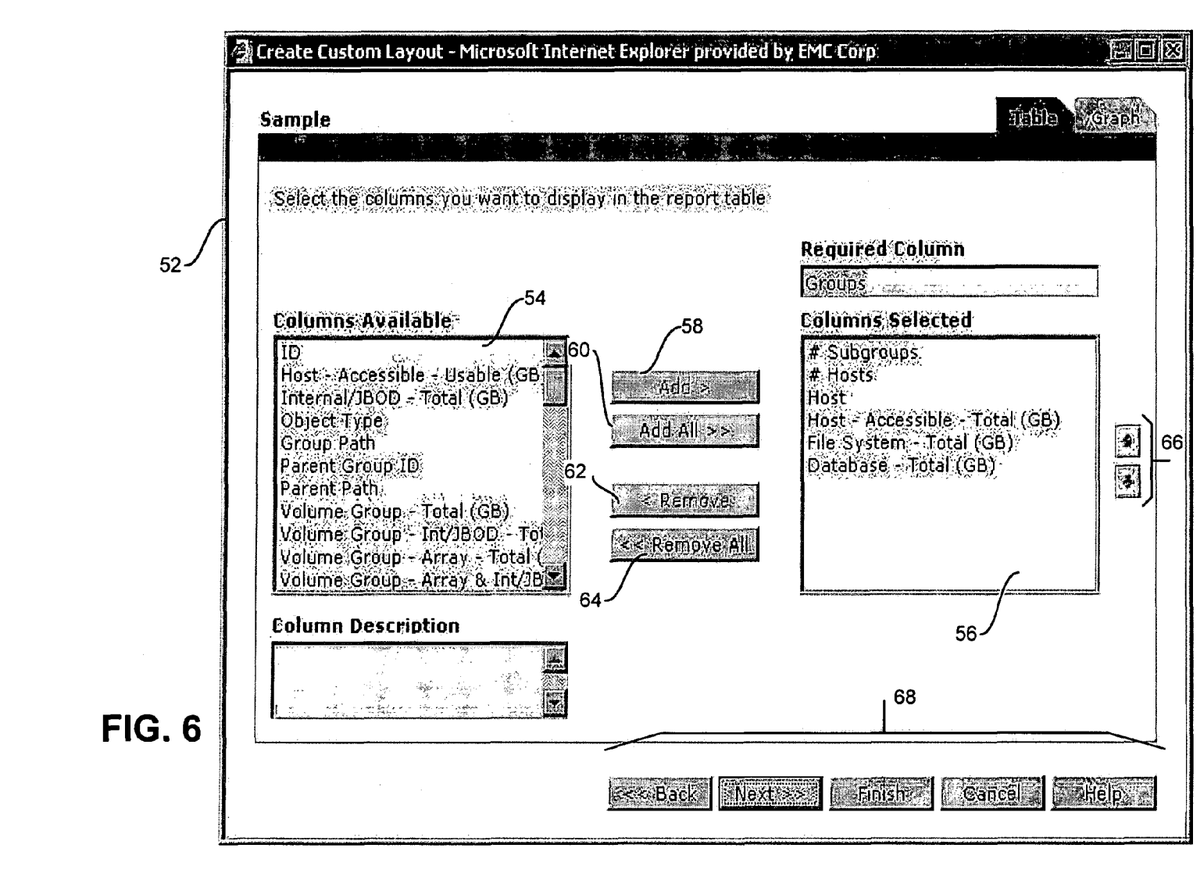
FIGS. 6-8 are screen shots of pages displayed as part of a graphical user interface on the chargeback reporting station of FIGS. 1 and 2 in connection with a process of creating customized layouts for chargeback reports such as those shown in FIGS. 4, 5 and 9.
Figure 7:
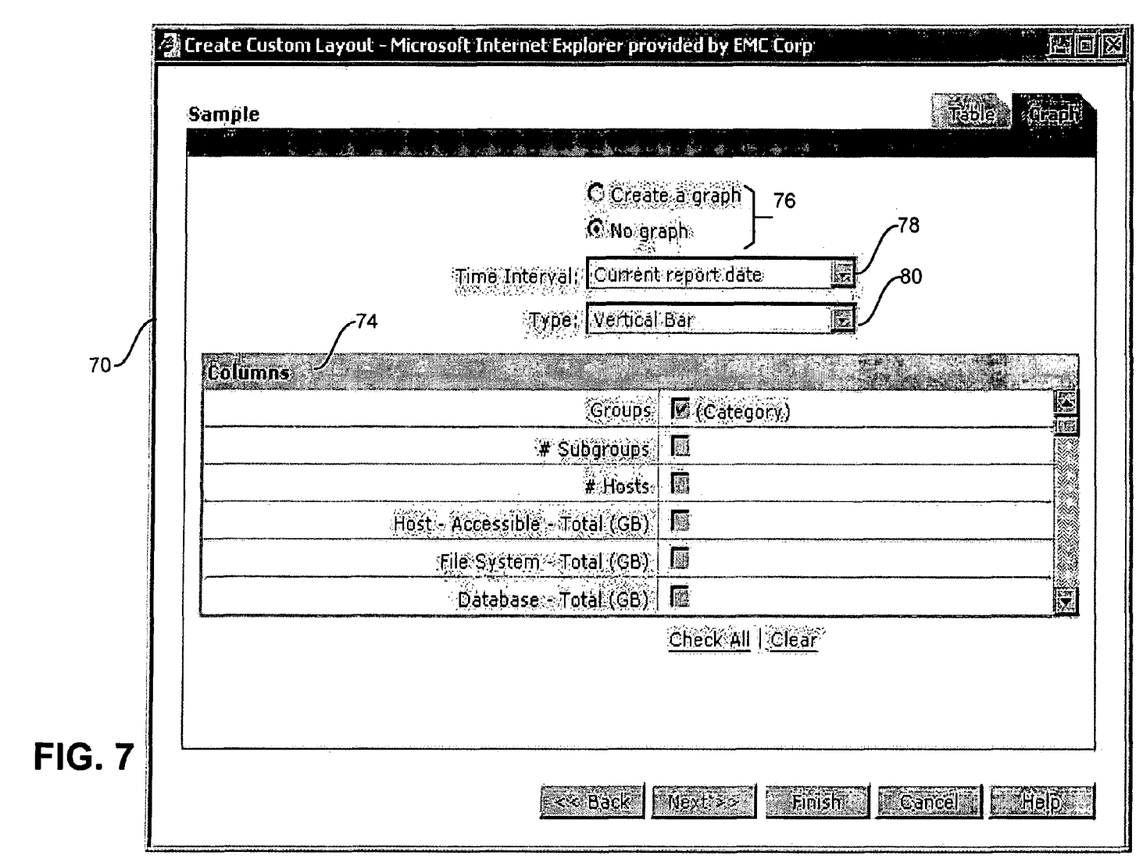
Figure 8:
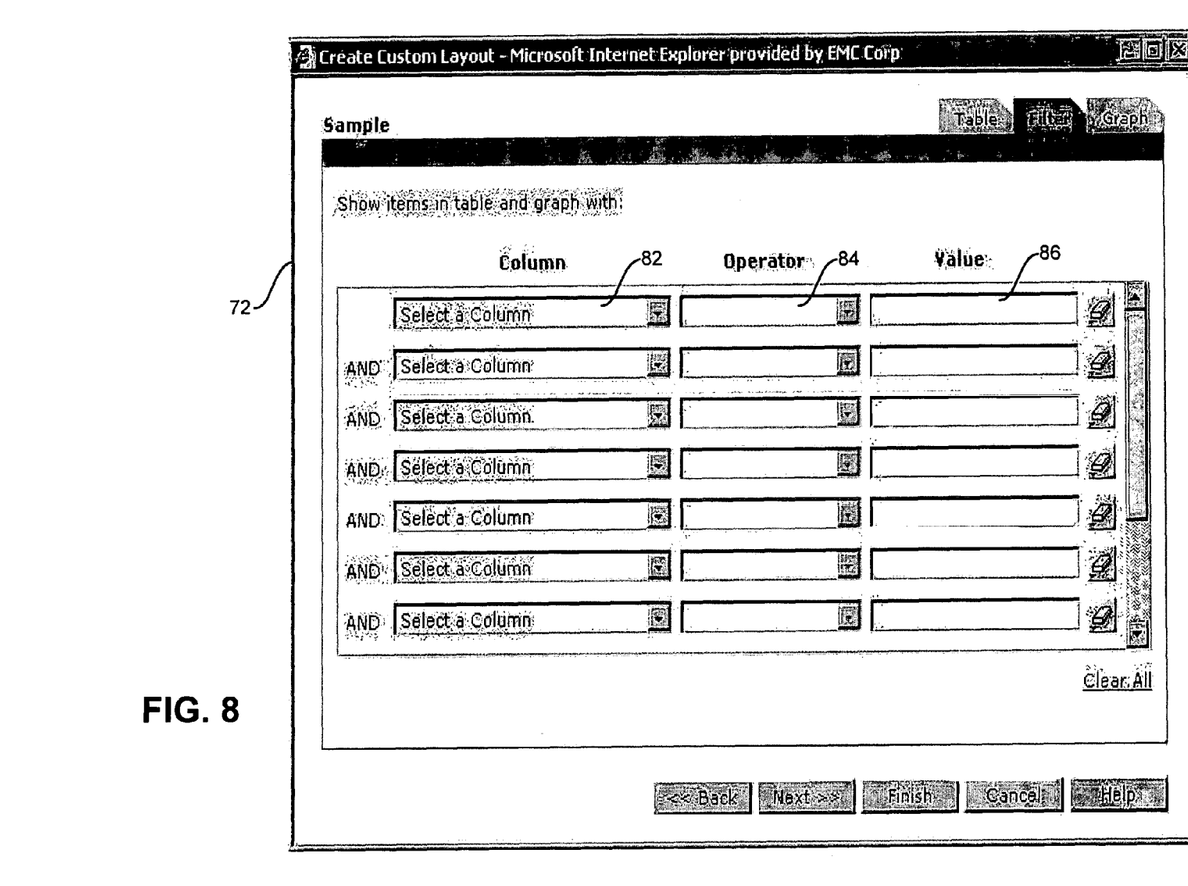

FIGS. 6 to 8 illustrate the custom layout creation process. FIG. 6 shows a first page 52 that is used to define the structure of a report table, which is the format shown in FIG. 4. A first field 54 lists all the fields or columns that are available for inclusion in the table, and a second field 56 lists all the fields/columns that have been selected for inclusion in the table. To include a column in a table, an operator uses a pointing device to highlight or "select" a entry in the first field 54 and then clicks on an "Add" button 58. In response, the process moves the selected item into the second field 56. For convenience, an "Add All" button 60 can be used to include all the available fields in the table. Corrections/modifications to the selection can be made by using "Remove" and "Remove All" buttons 62 and 64. Up/Down buttons 66 can be used to change the order of the selected columns, which will be reflected in the final table.

The following is an example listing of fields or columns that might be made available via the first field 54 for creating custom reports:

1. Groups
2. # Subgroups
3. # Hosts
4. Host
5. Host—Accessible—Total (GB)
6. File System—Total (GB)
7. Database—Total (GB)
8. Host—Accessible-Usable (GB)
9. Internal/JBOD—Total (GB)
10. Object Type
11. Group Path
12. Parent Path
13. Volume Group—Total (GB)
14. Volume Group—Int/JBOD—Total (GB)
15. Volume Group—Array—Total (GB)
16. Volume Group—Array & Int/JBOD—Used (GB)
17. Volume Group—Int/JBOD—Used (GB)
18. Volume Group—Array—Used (GB)
19. Logical Volume—Array & Int/JBOD—Total (GB)
20. Logical Volume—Int/JBOD—Total (GB)
21. Logical Volume—Array—Total (GB)
22. Logical Volume—Array & Int/JBOD—Used (GB)
23. Logical Volume—Int/JBOD—Used (GB)
24. Logical Volume—Array—Used (GB)
25. File System—Array & Int/JBOD—Total (GB)
26. File System—Int/JBOD—Total (GB)
27. File System—Array—Total (GB)
28. File System—Array & Int/JBOD—Used (GB)
29. File System—Int/JBOD—Used (GB)
30. File System—Array—Used (GB)
31. Database—Array & Int/JBOD—Total (GB)
32. Database—Int/JBOD—Total (GB)
33. Database—Array—Total (GB)
34. Database—Array & Int/JBOD—Used (GB)
35. Database—Int/JBOD—Used (GB)
36. Database—Array—Used (GB)
37. Local Replica—Allocated—Usable (GB)
38. Remote Replica—Allocated—Usable (GB)
39. Replica—Allocated—Usable (GB)
40. Array—Allocated—Usable (GB)
41. Primary—Allocated—Usable (GB)
42. Database—Raw (GB)
43. # File Systems
44. File System—Used (GB)
45. # Databases
46. Database—Used (GB)
47. # Logical Volumes
48. # Volume Groups
49. Logical Volume—Total (GB)
50. Logical Volume—Used (GB)
51. # Host Devices
52. # Accessible Devices
53. # Allocated Devices
54. Host—Accessible—Used (GB)
55. Volume Group—Used (GB)
56. Host—Allocated—Raw (GB)
57. Primary—Allocated—Raw (GB)
58. Local Replica—Allocated—Raw (GB)
59. Remote Replica—Allocated—Raw (GB)
60. Replica—Allocated—Raw (GB)
61. Host—Accessible—Raw (GB)

In the above list, the acronym "JBOD" stands for "just a bunch of disks", an informal term used to describe a set of disks that are generally internal to a host and not included within any data protections schemes implemented within or among the storage devices 14C of the SAN 12.

The Table page 52 also includes navigation buttons 68 to enable an operator to indicate whether he/she is finished, whether the operation is to be cancelled, or whether to go to another page to define other customizations of the layout. These include a Graph page 70 for creating a custom graph, as shown in FIG. 7, and a Filter page 72 shown in FIG. 8 that is used to further restrict the items that are displayed in either a table or a graph.

With respect to the Graph page 70 (FIG. 7), a "Columns" field 74 lists those columns selected by the operator via the Table page 52, as discussed above, and thus any custom graph is a subset of a corresponding custom table. The Graph page 70 also includes controls 76 for whether or not a graph is generated; a time interval selection field 78 to enable the operator to view data from a particular time frame; and a graph type selection field 80 to enable the selection of different types of graphs, such as a vertical bar graph as shown.

The Filter page 72 (FIG. 8) includes multiple rows of column, operator and value selection fields 82, 84 and 86, each of which can specify a particular filtering criterion. These are ANDed together automatically to form the entire filter. This structure enables the creation of a filter of the following type, as an illustrative example, which focuses the custom report on only those groups having more than 20 hosts and usable host-accessible capacity in excess of 100 GB:

|  | Column | Operator | Value |
|---|---|---|---|
|  | # Hosts | Greater Than | 20 |
| AND | Host-Accessible-Usable | Greater Than | 100 GB |

Figure 9:
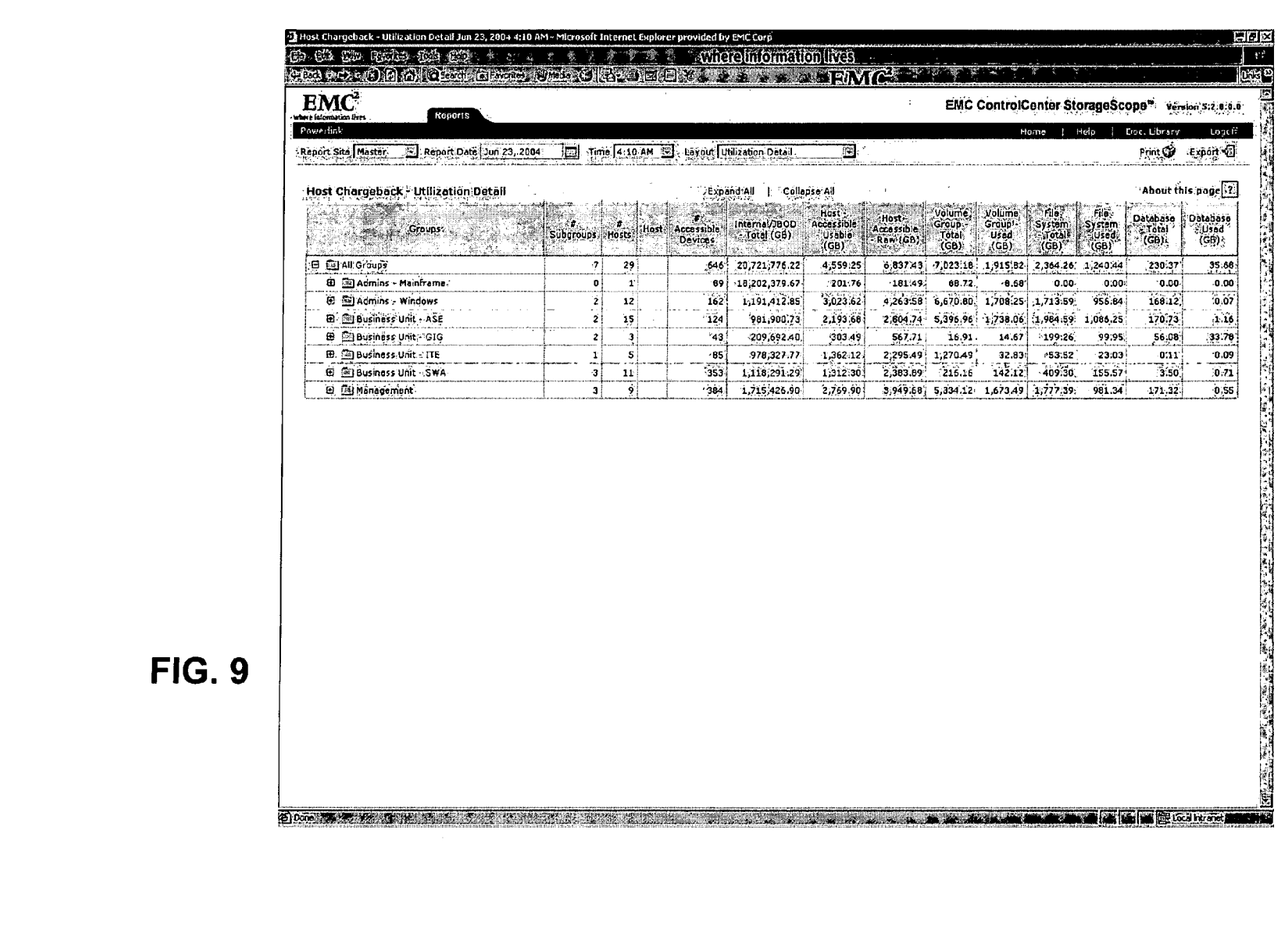

FIG. 9 shows an example of another report according to a "Utilization Detail" layout. This report includes more columns than the report of FIGS. 4 and 5, specifically columns for "Total" and "Used" capacities in various Dimension I categories. The storage asset information that appears in the graphical user interface may include information about disk type and "frame" type/generation, where "frame" refers to a distinct type of storage device 14C. Examples of disk types include SCSI and ATA; examples of frame types may include manufacturer and product line (for example, the SYMMETRIX® and CLARiiON® lines of storage arrays sold by EMC Corporation). Examples of generation may include different products or models within a product line.

The storage asset information may also include information about file ownership and other aspects of a file system, including directory information. This information can be used for generating chargeback data accordingly, e.g., based on the identities of file owners, per the operating system, or on the basis of the owner or user of a directory or other part of a file system. For example, if a file system includes two directories /www/app1 and /www/app2, the capacity information for all files and directories below /app1/ can be reported separately from those below /app2/.

In the foregoing description, the asset and utilization information generated by the chargeback reporting process 24 and displayed in the reports of the graphical interface does not include actual charges in units of currency. As mentioned above, the information can be used in conjunction with a separate spreadsheet, for example, which applies predetermined charge factors (in the form of currency units per storage unit (e.g., $/GB)) to the utilization amounts to arrive at actual charge amounts. This approach gives a user of the system flexibility in how he/she uses the utilization data. This flexibility is beneficial, because the chargeback reporting process 24 may be used to support chargeback to data storage system users who have different methods or models of calculating actual charges, even if based on the same raw utilization information. Thus, different users can employ their own spreadsheets that reflect their own particular calculation method.

However, in alternative embodiments, it may be desirable that the chargeback reporting process 24 itself include (or have direct access to) charge factors, apply them to the utilization amounts in some predetermined manner, and display the calculated charge amounts either in addition to or instead of the utilization amounts. It will be appreciated that in such embodiments, any fields for either the charge factors or calculated charge amounts will preferably appear in the "Columns Available" field 54 of the Table page 52, thus enabling a user to create a report layout including such fields/columns.

What is claimed is:

1. A method, comprising:
   executing, via a processor, a set of computer program instructions on a non-transitory computer readable medium for obtaining, via a processor, data records including:
   (a) asset information pertaining to storage assets in a data storage system; the storage assets including redundant storage assets having raw storage capacities exceeding usable storage capacities, the storage assets further including (i) internal storage assets directly accessible by respective host computers and (ii) external storage assets separate from the host computers, the asset information being organized according to (i) host-visible structure and (ii) location and protection, the host-visible structure including logical volumes, volume groups, file systems and databases, the location and protection including internal and external storage, the external storage further including primary storage and replica storage;
   (b) utilization information pertaining to use of the storage assets, the utilization information being organized according to (i) total capacity, (ii) used capacity, (iii) accessible capacity, and (iv) allocated capacity, these capacities being expressed in terms of raw and usable amounts; and
   (c) grouping information reflecting a grouping of the storage assets and the users into respective charge-related groups;
   selectively aggregating the asset and utilization information according to the grouping to obtain asset and utilization values usable for chargeback-related purposes; and
   presenting a graphical user interface reflecting the grouping, the graphical interface including information fields in which respective ones of the asset and utilization values are displayed.

2. A method according to claim 1, wherein the graphical user interface enables the specification of a layout for a charge report to be displayed as part of the graphical user interface, the layout specification including a selection of information fields including user group identifiers, storage asset group identifiers, and respective utilization amounts of the storage assets.

3. A method according to claim 2, wherein the graphical user interface includes a table screen, a graph screen, and a filter screen, the table screen enabling the selection and arrangement of information fields from a set of available information fields for inclusion in a table-style report of the graphical user interface, the graph screen enabling the specification of a type of graph to be displayed as part of the graphical user interface, the filter screen enabling the specification of one or more criteria for limiting the items displayed as part of the graphical user interface.

4. A method according to claim 1, wherein the grouping is hierarchical.

5. A method according to claim 1, wherein the redundant storage assets include local and remote replicas of respective primary storage assets.

6. A method according to claim 1, wherein the asset information includes information about disk types, frame types and generations, and protection types.

7. A method according to claim 1, wherein the asset information includes information about file owners.

8. A method according to claim 1, wherein the asset information includes information about file system directory structure.

9. A method according to claim 1, comprising applying predetermined charge factors to the utilization values to obtain corresponding charge values, wherein the graphical user interface includes information fields in which respective ones of the charge values are displayed.

10. A computerized system, comprising:
   an interface to a storage area network, the interface responsive to processor;
   a graphical display operative to display a graphical user interface; and
   a processor coupled to the graphical display, the processor being operative to execute a method comprising:
      obtaining, by the processor, data records including:
         (a) asset information pertaining to storage assets in a data storage system; the storage assets including redundant storage assets having raw storage capacities exceeding usable storage capacities, the storage assets further including (i) internal storage assets directly accessible by respective host computers and (ii) external storage assets separate from the host computers, the asset information being organized according to (i) host-visible structure and (ii) location and protection, the host-visible structure including logical volumes, volume groups, file systems and databases, the location and protection including internal and external storage, the external storage further including primary storage and replica storage;
         (b) utilization information pertaining to use of the storage assets, the utilization information being organized according to (i) total capacity, (ii) used capacity, (iii) accessible capacity, and (iv) allocated capacity, these capacities being expressed in terms of raw and usable amounts; and
         (c) grouping information reflecting a grouping of the storage assets and the users into respective charge-related groups;
      selectively aggregating the asset and utilization information according to the grouping to obtain asset and utilization values usable for chargeback-related purposes; and
      presenting a graphical user interface reflecting the grouping, the graphical interface including information fields in which respective ones of the asset and utilization values are displayed.

11. A computerized system according to claim 10, wherein the graphical user interface enables the specification of a layout for a charge report to be displayed as part of the graphical user interface, the layout specification including a selection of information fields including user group identifiers, storage asset group identifiers, and respective utilization amounts of the storage assets.

12. A computerized system according to claim 11, wherein the graphical user interface includes a table screen, a graph screen, and a filter screen, the table screen enabling the selection and arrangement of information fields from a set of available information fields for inclusion in a table-style report of the graphical user interface, the graph screen enabling the specification of a type of graph to be displayed as part of the graphical user interface, the filter screen enabling the specification of one or more criteria for limiting the items displayed as part of the graphical user interface.

13. A computerized system according to claim 10, wherein the grouping is hierarchical.

14. A computerized system according to claim 10, wherein the redundant storage assets include local and remote replicas of respective primary storage assets.

15. A computerized system according to claim 10, wherein the asset information includes information about disk types, frame types and generations, and protection types.

16. A computerized system according to claim 10, wherein the asset information includes information about file owners.

17. A computerized system according to claim 10, wherein the asset information includes information about file system directory structure.

18. A computerized system according to claim 10, wherein the method comprises applying predetermined charge factors to the utilization values to obtain corresponding charge values, wherein the graphical user interface includes information fields in which respective ones of the charge values are displayed.

19. Software encoded in one or more non-transitory computer-readable media for execution and, when executed by a processor, performs a method comprising:
   obtaining, by the processor, data records including:
      (a) asset information pertaining to storage assets in a data storage system; the storage assets including redundant storage assets having raw storage capacities exceeding usable storage capacities, the storage assets further including (i) internal storage assets directly accessible by respective host computers and (ii) external storage assets separate from the host computers, the asset information being organized according to (i) host-visible structure and (ii) location and protection, the host-visible structure including logical volumes, volume groups, file systems and databases, the location and protection including internal and external storage, the external storage further including primary storage and replica storage;
      (b) utilization information pertaining to use of the storage assets, the utilization information being organized according to (i) total capacity, (ii) used capacity, (iii) accessible capacity, and (iv) allocated capacity, these capacities being expressed in terms of raw and usable amounts; and
      (c) grouping information reflecting a grouping of the storage assets and the users into respective charge-related groups;
   selectively aggregating the asset and utilization information according to the grouping to obtain asset and utilization values usable for chargeback-related purposes; and
   presenting a graphical user interface reflecting the grouping, the graphical interface including information fields in which respective ones of the asset and utilization values are displayed.

* * * * *